United States Patent Office 3,697,464
Patented Oct. 10, 1972

3,697,464
PREPARATION OF PIGMENTARY
BETA-QUINACRIDONE
Vito Albert Giambalvo, Middlesex, and Philip Randolph Ruby, Millington, N.J., assignors to American Cyanamid Company, Stamford, Conn.
No Drawing. Continuation-in-part of abandoned application Ser. No. 622,941, Mar. 14, 1967. This application Mar. 15, 1971, Ser. No. 124,451
Int. Cl. C07d 37/18
U.S. Cl. 260—279 R                  7 Claims

ABSTRACT OF THE DISCLOSURE

This invention relates to a process of producing pigmentary linear quinacridone of the "beta" crystalline form by treating quinacridone material with an aryl sulfonic acid, optionally in the presence of sulfuric acid, diluting the resultant mixture with water to cause precipitation, heating the precipitated product in the aqueous menstruum and recovering the desired product from the mixture.

CROSS REFERENCES

This is a continuation-in-part of our application Ser. No. 622,941, filed Mar. 14, 1967, and abandoned in favor hereof.

This invention relates to an improved method for producing linear quinacridone of the "beta" crystal form having a red-violet shade, by an acid pasting process starting with a linear quinacridone material of any polymorphic form. The process of this invention comprises treating the quinacridone which may be crude with aryl sulfonic acid, which may be mixed with concentrated sulfuric acid to form a solution or partial solution, diluting the resultant mixture with water to cause precipitation, heating the resulting mixture and recovering the desired product from the mixture.

It is known that linear quinacridone of the "beta" crystalline polymorphic form can be prepared by a number of methods. Among such methods are included ball-milling, base-pasting, acid-salting and acid-pasting. Each of these processes is possessed of one or more major deficiencies which tends to make such process unattractive. The ball-milling procedure requires long milling cycles, gives low production rates per unit volume and needs high capital investment for practical operation. Additionally, ball-milling creates problems in materials-handling such as undesirable packing in the mill and poor discharge from and erosion of the mills. Moreover, the pigment may suffer from contamination with iron powder from the mill or the grinding media, and there is often difficulty in the recovery of solvents. Further, such a process is not readily applicable to all crude quinacridones since phase conversion, as well as particle size reduction, are involved and the rate of conversion can be greatly influenced by the crystalline state of the crude. Moreover, even small quantities of impurities can adversely affect results.

Base-pasting processes, comprising conversion of crude linear quinacridone of any crystal form to the "beta" form by treatment with alkali in aqueous alcohols and alcohol-ether mixtures, generally require large quantities of expensive solvents. Where lower quantities of such solvents are employed, super-atmospheric pressure must be employed. The procedure is a lengthy, multi-step one, and requires extensive handling of the solvents. Acid-salting, using aluminum chloride in an inert solvent, followed by regeneration with an electron donor solvent, requires ball-milling for optimum color values, the employment of special alloys to overcome the corrosive nature of the acid-salt and an extensive system for the recovery of solvents. Both the solvents and acid-salt are relatively expensive.

U.S. Pat. 3,326,918, W. A. West, June 20, 1967 discloses some general characteristics of quinacridone pigments and one method of producing beta-quinacridone pigment by dissolving a quinacridone in sulfuric acid, adding or forming a sulfonic acid, and drowning. A related U.S. Pat. 3,362,957, W. A. West, Jan. 9, 1968, discloses a process of producing the gamma form of quinacridone by adding quinacridone sulfonic acid before drowning, and having acetic acid present during the drowning.

If the sulfonic acid is formed in situ by sulfonating xylene, toluene, benzene or naphthalene, some quinacridone sulfonic acid may be produced.

Acid-pasting, effected with polyphosphoric acid followed by treatment with a water-miscible solvent, in addition to being lengthy and multi-step, employs an expensive acid and large quantities of water-miscible solvents. The handling and recovery of these hazardous and volatile solvents is difficult. Also, polyphosphoric acid is highly corrosive and requires equipment fabricated of special alloys.

Though conversion to beta-phase quinacridone may also be effected with methyl sulfuric acid, the expense and toxicity of the costly acid discourages practical consideration of this method. Also, the quality of the resulting product does not meet the current commercial standards for this type, departing widely in strength and clarity of shade.

Since acid-pasting processes based on sulfuric acid are an extremely desirable way of producing other pigments because of its simplicity, economical reagents, high production rate, short time cycles, low capital investment and long history in the art of conditioning many other pigments, the adaptation of this method to the preparation of linear quinacridone of the "beta" crystalline form, would be desirable. However, all known processes based on mere sulfuric acid-pasting, result in the "alpha" crystal form of linear quinacridone, which form is unsuitable in shade for blending with red to orange pigments to achieve dark red finishes of superior durability. Only the "beta" polymorph of linear quinacridone possesses the proper and compatible tristimulus color values for this purpose. There exists, therefore, the need for a process by which linear quinacridone of the "beta" crystal form can be readily produced from crude coarse linear quinacridones of any polymorphic form, while overcoming all, or most, of the deficiencies of the former processes.

It has now been discovered that linear quinacridone of the "beta" polymorphic form can be produced from crude coarse linear quinacridone of random polymorphic form by forming a solution or partial solution of the quinacridone starting material in sulfuric acid containing an aryl sulfonic acid, forming an aqueous mixture by addition of water, and then recovering the desired product by separating it from the aqueous phase, and washing until neutral. The usefulness of this method is surprising in view of the fact that sulfuric acid-pasting normally produces the "alpha" polymorph (as shown in U.S. Pat. No. 2,844,484). It is also surprising that the phase conversion is effected merely by the presence of aryl sulfonic acid in the concentrated acid medium, since the product does not assume crystal identity until subsequent dilution with water. Thus, the presence of aryl sulfonic acid only during the water dilution step instead of in the concentrated acid medium, is no more effective in producing the "beta" form than is the sulfuric acid alone.

The "crude" linear quinacridone employed in the process of the present invention may be prepared by any of well-known methods. One such method is to react diethyl-2,5-dianilino-3,6-dihydro-terephthalate with a mixture of biphenyl and diphenyl oxide and subsequent oxidation of the 6,13-dihydroquinacridone thus produced. Another process is to ring-close 2,5-dianilino-terephthalic acid in polyphosphoric acid at 120° C. and isolate the resulting crude linear quinacridone by extensive washing with dilute alkali-water and alcohol. The products thus obtained are generally in coarse crude form, requiring further work-up to allow them to be converted to any of the desired crystalline forms.

In the present invention, linear quinacridone in crude coarse form or in any of its crystalline modifications may be employed. For economy, it is preferred to employ the crude coarse form. In carrying out the present invention, one part of this material is suspended in from about five to about twenty-five weight parts, preferably seven to twenty parts, of concentrated sulfuric acid of 86% to 100% strength containing one to about five parts or even more, preferably 2 to 3 parts (based on the weight of the precursor aryl hydrocarbon), of an aryl sulfonic acid. Such presence may be achieved by direct addition of the aryl sulfonic acid or by the addition of the unsulfonated aryl hydrocarbon precursor with suitable adjustment of the reaction process to allow for sulfonation to be effected in situ. Sulfonation of the hydrocarbon precursors generally is effected by heating the reaction mixture at about 50° C. for about 30 minutes. The sulfonation is best accomplished prior to the addition of the quinacridone. The reaction mixture is stirred sufficiently to effect dispersion of the quinacridone, which will occur readily where the temperature is allowed to reach 50° C.

Substantially only aryl sulfonic acid may be used as the solvent. Sulfuric acid is usually less expensive than the aryl sulfonic acid, but costs of disposal of by-products may alter the economics of the process.

For optimum results, the concentration of sulfuric acid, the quantity of sulfuric acid, the length of acid treatment and the temperature during treatment should be balanced so that the pigment will be at least partially dissolved, but not sulfonated. The stronger the $H_2SO_4$, and the more of it, the more capable it is to sulfonate the quinacridone material. But, advantageously, this can be avoided by conducting the acid treatment at moderate temperatures for a limited time. Since aromatic hydrocarbons, such as xylene, for example, are more easily sulfonated than the quinacridone material, it is feasible to have conditions which are strong enough to sulfonate the hydrocarbon without concurrently sulfonating the quinacridone. Sulfuric acids in the lower part of the above-noted concentration range are useful for this invention, but it may be required to use a large quantity of acid (e.g., 25 parts per part of quinacridone). The following table shows the interdependence of concentration, time and temperature on degree of sulfonation of the quinacridone material. Sulfuric acid of 99.5+% concentration was used in a sufficient quantity to dissolve the quinacridone.

| Standing | | |
|---|---|---|
| Time (hrs.) | Temperature (° C.) | Sulfonation of quinacridone |
| 2 | 25 | None. |
| 2 | 55 | Some. |
| 24 | 25 | 50%. |

Thus, it can be seen, for example, that with strong acid and a treatment time of two hours, the temperature should not go above about 60° C. if sulfonation is to be avoided.

The aryl sulfonic acid employed may be any of those containing not more than two carbocyclic rings, which may be substituted with non-interfering substituents, such as alkyl, halo, haloalkyl, etc., radicals. Such acids are typified by toluene sulfonic acid, xylene sulfonic acid, naphthalene sulfonic acid, benzene sulfonic acid, 2-methyl-5-chlorotoluene sulfonic acid, etc. The acid precursors employed when sulfonation is carried out in the reaction mixture include toluene, xylene, naphthalene, benzene, 3-chlorotoluene, etc. The sulfonation temperatures are adjusted to the characteristics of the particular hydrocarbon as known in the sulfonation art.

The quinacridone, sulfuric acid, aryl sulfonic acid mixture is then added rapidly, with vigorous agitation, to water, preferably at about 90 to 100° C. in an amount such that from about five-fold to approximately a twenty-fold dilution, preferably from seven-fold to fourteen-fold dilution, takes place. The diluted reaction mixture is allowed to stand, preferably at 90 to 100° C. for an additional time (e.g., 5 to 30 minutes), and then cooled, separated, washed until neutral and finally dried. The product in the "beta" crystalline form may be pulverized or otherwise modified as to aggregate size, if desired.

The most efficient quench temperature is at or near the boil. At lower temperatures, conversion to the beta form occurs, but at longer exposure times as shown in the following table.

| Quench conditions | | |
|---|---|---|
| Temperature, ° C. | Time (min.) | Conversion, percent |
| 10–25 | 60 | 75 |
| 25–40 | 60 | Ca. 100 |
| 95 | 5 | Ca. 100 |

Certain additives may be used in the process of this invention, if desired, as further aids in the conditioning of the pigment obtained. For example, the addition of about 4.0% of cetyl alcohol based on the weight of the quinacridone, to the acid dispersion thereof, produces a softer product which is more conveniently handled in the subsequent separation and washing operations.

The bluish red to violet "beta" phase quinacridone is a very durable and very stable pigment. It has special utility for uses where it may be exposed to the elements, especially light, and where stability to chemical agents and solvents are required. Thus, it is a valuable pigment for use in automotive finishes where it is valuable in its own right as a transparent violet; and it is equally useful in blending to give reddish-blue shades. It is also useful in coloring linoleum, vinyl plastics, rubber, synthetic fibers and is valuable for outdoor posters.

The invention is more fully illustrated by the examples which follow. In the examples and the claims, all parts are by weight unless clearly otherwise set forth.

EXAMPLE 1

To a 10 gallon stainless steel kettle was charged 60 lbs. of sulfuric acid of 99% strength. To it with stirring was added 1.5 lbs. of ice. Next was added 9 lbs. of xylene. The mixture was stirred at 55±5° C. for 30 minutes whereby the xylene was sulfonated and there was then added 0.175 lb. of cetyl alcohol as a processing aid. The mixture was then stirred an additional 15 minutes at 55±5° C. and the reaction was cooled to 30° C. 4.5 lbs. of pulverized crude quinacridone was added and the mixture stirred for one hour whereupon solution was complete.

To a 150 gallon tank containing 620 lbs. of water vigorously agitated and at a temperature of 90–95° C. was added the above reaction mixture. After addition was complete, the tank was held at 95±5° C. for an additional 15 minutes; the mixture was then further diluted, with cold water reaching a temperature below 65° C. The product was then filtered off, backwashed in the filter press until neutral, removed and dried at 75°±5° C. The product was then micropulverized through a coarse (3/32") screen.

EXAMPLE 2

Following the procedure of Example 1, but substituting for the crude coarse quinacridone, a previously conditioned sample thereof in the "alpha" crystal form, a product identical with that of Example 1 is obtained. This example shows that quinacridone undergoes transformation in the process of this invention even if the quinacridone was in the alpha polymorphic form.

EXAMPLE 3

Following the procedure of Example 1, but substituting for the crude coarse quinacridone, a previously conditioned sample thereof in the "gamma" crystal form, a product identical with that of Example 1 is obtained.

EXAMPLE 4

To 12 parts of 96–97% $H_2SO_4$ was added 1 part of crude coarse alpha quinacridone. The mixture was stirred at 30±5° C. until the solids dissolved (about 1 hour). Four parts of paratoluene sulfonic acid monohydrate (2 parts of toluene) was added and the mixture stirred until complete solution resulted (about 0.5 hr.).

The acid paste mix was drowned into 140 parts of water at 85–95° C. and isolated as in Example 1. The product was a linear quinacridone of the "beta" crystal form in near quantitative yield.

EXAMPLE 5

To a charge of 43.2 parts of 30% oleum was added 14.6 parts of benzene, with stirring, over a period of approximately an hour, while controlling the temperature to a maximum of about 80° C. In larger reactors, cooling is required to prevent the temperature from rising above 80° C. In smaller reactors, the surface of the reactor may provide adequate cooling by the ambient atmosphere. The mixture was stirred between 75 and 80° C. for an additional hour to insure thorough sulfonation. 22.2 parts of xylene was added, with stirring, over a period of approximately one hour while allowing the temperature to rise to about 90° C. After the addition of the xylene, the reaction mixture was heated at about 1° C. per minute to 110° C. and held at 110 to 115° C. for about one hour with stirring. By this time the hydrocarbon layer had essentially disappeared, giving a mixture of benzene sulfonic acid and xylene sulfonic acid with only a minor proportion of residual unreacted sulfuric acid. The mixture of benzene sulfonic and xylene sulfonic gives a lower freezing point than either alone which assures fluidity at lower temperatures. The charge was cooled to about 75° C. and 0.2 part of cetyl alcohol was added, followed by stirring for an additional half hour.

To the charge was then added 5 parts of pulverized crude quinacridone while holding the temperature between 68 and 70° C. If the temperature rises too high, the quinacridone may be sulfonated or decomposed, whereas if the temperature is too low the charge does not completely dissolve. After stirring for two hours until complete solution occurred, the charge was struck by drowning through jets into 200 parts of water at 55 to 60° C. Jet drowning causes precipitation to proceed in the region of turbulent flow which produces finer and more uniform particles as compared with a poured-drowned procedure, and the finer particles are characterized by a darker mass tone, higher transparency, bluer shades and higher strength. The drown mixture was heated to 90° C. and held at this temperature with stirring for about ¾ of an hour, after which it was cooled to 60° C. and filtered. The pigmentary product was washed with water until neutral to Congo red and then washed with 47 parts of water containing 1.66 parts of aqueous ammonium, then again washed with water till neutral. The cake was blown with air and dried in a circulating air oven at between 70 and 80° C., then pulverized through a coarse screen. Substantially a quantitative yield was obtained which was slightly more than the weight of the orginial crude quinacridone due to the absorption of cetyl alcohol.

The pigment as so produced exhibited excellent characteristics as pigmentary beta linear quinacridone.

The mixture of benzene and zylene sulfonic acid may be considerably diluted with concentrated sulfuric acid, however the solution can occur without much sulfuric acid being present in which case the risk of sulfonating the linear quinacridone is reduced. The quantities can be adjusted depending on the temperature but substantially all of the linear quinacridone should be in the solution at the time the solution is struck.

Mixtures of other sulfonic acids, such as toluene sulfonic acid, xylene sulfonic acid, naphthalene sulfonic acid and benzene sulfonic acid or the individual sulfonic acids, alone or mixed with concentrated sulfuric acid all give good results.

We claim:

1. A process for the preparation of pigmentary beta phase linear quinacridone consisting essentially of:
    (a) heating a solvent consisting of at least about 15 parts of at least one sulfonic acid from the group consisting of benzene, toluene, xylene and naphthalene sulfonic acids and which may contain up to about 80% concentrated sulfuric acid and which sulfonic acid may have been sulfonated in situ, and may contain up to 0.04 part cetyl alcohol,
    (b) dissolving therein one part of linear quinacridone at a temperature of at least about 30° C. under non-sulfonating conditions,
    (c) contacting the solution of step (b) with water, and
    (d) processing at a temperature of about 90° C. to 100° C.

thereby inducing transformation to the beta phase.

2. The process of claim 1 wherein about 4% cetyl alcohol based on the weight of quinacridone is added to the acid dispersion before step (c).

3. The process of claim 2 wherein benzene sulfonic acid is present which is formed in situ by the sulfonation of benzene, before the addition of the quinacridone.

4. The process of claim 2 wherein toluene sulfonic acid is present which is formed in situ by the sulfonation of toluene before the addition of the quinacridone.

5. The process of claim 2 wherein xylene sulfonic acid is present which is formed in situ by the sulfonation of xylene before the addition of the quinacridone.

6. The process of claim 2 wherein naphthalene sulfonic acid is present which is formed in situ by the sulfonation of naphthalene before the addition of the quinacridone.

7. The process of claim 1 in which a mixture of about 1 to about 5 parts of said sulfonic acid and about 5 to 25 parts of concentrated sulfuric acid is the solvent to which the linear quinacridone is added.

References Cited

UNITED STATES PATENTS

| | | | |
|---|---|---|---|
| 3,326,918 | 6/1967 | West | 260—279 |
| 3,362,957 | 1/1968 | West | 260—279 |

DONALD G. DAUS, Primary Examiner

U.S. Cl. X.R.

106—288 Q; 260—505 E